Jan. 18, 1949.  E. B. NOEL  2,459,579
ELECTRODE STRUCTURE
Filed Aug. 6, 1947

Inventor:
Edward B. Noel,
by *Vernet C. Kauffman*
His Attorney.

Patented Jan. 18, 1949

2,459,579

UNITED STATES PATENT OFFICE 2,459,579

ELECTRODE STRUCTURE

Edward B. Noel, Cleveland Heights, Ohio, assignor to General Electric Company, a corporation of New York Application August 6, 1947, Serial No. 766,560

2 Claims. (Cl. 250—27.5)

My invention relates to gaseous electric discharge devices generally, and more particularly to electrode structures therefor.

An object of my invention is the provision of electrodes, and method of fabrication thereof, which will successfully withstand repeated applications of tremendously high energy loading. Another object is the provision of a structure which will provide large heat storage and radiant capacity for the electrodes. Still another object is to provide a construction which will accurately define the position of the arc path.

Figure 1:
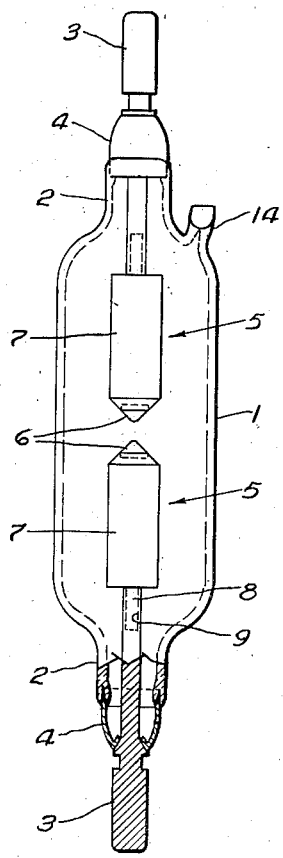
Figure 3:
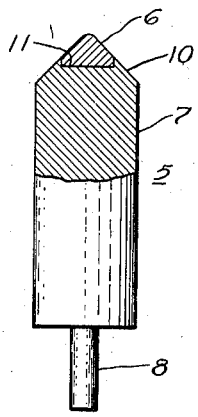
Figure 2:
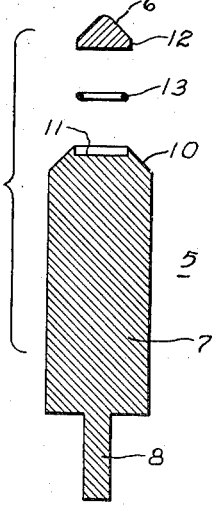

Further objects and features of my invention will appear from the following description of a species thereof and from the drawing wherein Fig. 1 is an elevation of a gaseous electric discharge lamp embodying my invention; Fig. 2 is an exploded sectional elevation, on an enlarged scale, of an electrode structure comprising my invention; and Fig. 3 is an elevation, partly in section and also on an enlarged scale, of the assembled electrode structure.

Referring to the drawing, the device shown in Fig. 1 is particularly useful as a flashlight tube or lamp adapted to emit flashes of light of extremely high intensity. The lamp comprises a tubular light-transmitting bulb 1 which may be made of a hard glass having a high melting point and low coefficient of expansion. The bulb is provided with tubular appendages or necks to each of which is sealed a terminal structure comprising a heavy rigid lead-in conductor in the form of a post or prong 3 of cold rolled steel, for example, having brazed thereto a thin metal ferrule or cup 4 the rim of which is fused into the end of the neck 2. The ferrule 4 may be made of a suitable metal or alloy capable of hermetically sealing to the glass bulb, for example, a nickel-iron or iron-nickel-cobalt alloy, as is well known. These terminals are of the type disclosed and claimed in Patent 2,098,080 to D. K. Wright which is assigned to the same assignee as the present invention.

At the center of the bulb is an arc gap, preferably about 3 to 4 mm. wide, between two massive electrodes 5 each comprising an arc-supporting electron-emissive tip portion 6 and a massive support or body portion 7 having a rearwardly and axially extending cylindrical appendage 8 seated within the bore 9 of the tubular inner end portion of the lead-in post 3 and preferably brazed or spot-welded thereto. The forward end of the body portion 7 of the electrode is formed to a truncated conical face 10 having a central recess 11 therein in which is snugly seated the cylindrical base portion 12 of the conical tip portion 6 of the electrode. Previous to insertion of the tip portion 6, a quantity of brazing material is inserted in the recess 11, preferably in the form of a wire ring 13. The assembly is then suitably heated to firmly braze the tip 6 into the recess 12. The conical portions of said tip 6 and body 7 thereby form a continuous tapered face, preferably forming a 90° cone.

The brazing material 13 may be a manganese-nickel alloy containing between 12 to 40 per cent manganese, as disclosed and claimed in Patent 2,237,184 to E. Lemmers. The same alloy, or copper, may be used to braze the ferrules 4 to the posts 3.

The body portion 7 of the electrode may be made of a single piece of cold rolled steel sufficiently massive to provide large heat storage and radiant capacity for the electrodes. A suitable proportioning for the body portion 7 is a cylinder of ⅜ inch diameter and about one inch long.

A tip portion 6 is composed of refractory metal and alkaline earth metal, preferably a tungsten-nickel-barium alloy which may have a composition of about 89% tungsten, 10% nickel and 1% barium.

The bulb 1 contains a suitable ionizable medium such as a filling of argon, krypton, xenon or mixtures of those gases with hydrogen. A presently preferred filling is krypton at a pressure of 1500 mm. of Hg in a bulb of 1¼ inch diameter and about 3 inches long. The bulb with its filling at super-atmospheric pressure is tipped off or sealed at the tabulation 14 by methods now well known in the art.

In operation, the shape of the brightest region of the arc between the electrodes 5 is approximately spherical with a diameter of about 12 mm. at maximum loading. This small size is important in many optical devices which can utilize light from only limited areas. A tube of the proportions herein indicated is designed to operate from power supplies of about 2000 volts, with a range of 1000 to 2500 volts, and a maximum rating of 200 watt-seconds at 2000 volts. Because of the low tube resistance, the flash duration can be very short—only a few microseconds on discharge circuits designed to take advantage of this feature.

What I claim as new and desire to secure by Letters Patent of the United States is:

1. An electrode construction for an electric discharge device comprising a metallic body member supported by a lead-in conductor and having a truncated tapered end aligned with the discharge path of said device, a recess in said end, and a metallic arc supporting element comprising refractory metal and alkaline earth metal seated in said recess and having a tapered tip extending therefrom and forming with said end a tapered electrode face for supporting an arc discharge at the apex of said element.

2. An electrode construction for an electric discharge device comprising a cylindrical metallic body member supported by a lead-in conductor and having a truncated conical end aligned with the discharge path of said device, a circular recess in said end, and an arc supporting element comprising a refractory metal and an alkaline earth metal in minor proportion and having a cylindrical base seated in said recess and a conical tip extending therefrom forming with said end a tapered electrode face for supporting an arc discharge at the apex of said tip.

EDWARD B. NOEL.

REFERENCES CITED

The following references are of record in the file of this patent:

UNITED STATES PATENTS

| Number | Name | Date |
| --- | --- | --- |
| 1,334,150 | Green et al. | Mar. 16, 1920 |
| 2,358,668 | Stewart | Sept. 19, 1944 |
| 2,407,245 | Benioff | Sept. 10, 1946 |